US006309683B1

(12) United States Patent
Coleman et al.

(10) Patent No.: US 6,309,683 B1
(45) Date of Patent: Oct. 30, 2001

(54) NOVELTY CANDY HOLDING DEVICE

(76) Inventors: Thomas J. Coleman, 19170 Paddock Pl., Abingdon, VA (US) 24211; William K. Schlotter, IV, 117 Wateredge La., Fredericksburg, VA (US) 22406; Princess Ann Coleman, 19170 Paddock Pl., Abingdon, VA (US) 24211; Ann M. Schlotter, 117 Wateredge La., Fredericksburg, VA (US) 22406

( * ) Notice: Subject to any disclaimer, the term of this patent is extended or adjusted under 35 U.S.C. 154(b) by 0 days.

(21) Appl. No.: 09/564,029

(22) Filed: May 4, 2000

(51) Int. Cl.[7] .................................................... A23G 3/00
(52) U.S. Cl. ......................... 426/134; 426/104; 426/132; 446/491; 446/397; 472/64
(58) Field of Search .................................. 426/134, 112, 426/115, 104, 132; 472/64; 446/491, 397

(56) References Cited

U.S. PATENT DOCUMENTS

| | | | |
|---|---|---|---|
| 5,302,403 | * | 4/1994 | Cook et al. ............................ 426/134 |
| 5,820,437 | * | 10/1998 | Coleman et al. ..................... 426/134 |
| 5,902,167 | * | 5/1999 | Filo et al. .............................. 426/134 |
| 6,054,156 | * | 4/2000 | Rudell et al. ......................... 426/134 |
| 6,120,816 | * | 9/2000 | Chan ..................................... 426/134 |
| 6,162,476 | * | 12/2000 | Shorin ................................... 426/134 |
| 6,187,350 | * | 2/2001 | Gallart et al. ........................ 426/134 |
| 6,221,407 | * | 4/2001 | Gallart et al. ........................ 426/134 |

* cited by examiner

Primary Examiner—Steven L. Weinstein
(74) Attorney, Agent, or Firm—Melvin L. Crane Agent

(57) ABSTRACT

A novelty candy holding device including a housing to which a candy pop can be secured. The housing includes a bottom end cap which prevents a pliable putty-like material in the housing from drying out. The bottom end cap can be removed to expose the pliable putty material into which one can insert their finger or fingers in order to move the putty material around so that movement of the putty makes a noise as air within the putty is moved. The device can have an end cap with a central opening secured to the housing. A stretchable diaphragm is secured over the central aperture so that one can force the diaphragm into the pliable putty material to move the putty material about so that a noise will be made as the putty material is moved, at which time air in the putty material will make a noise.

5 Claims, 2 Drawing Sheets

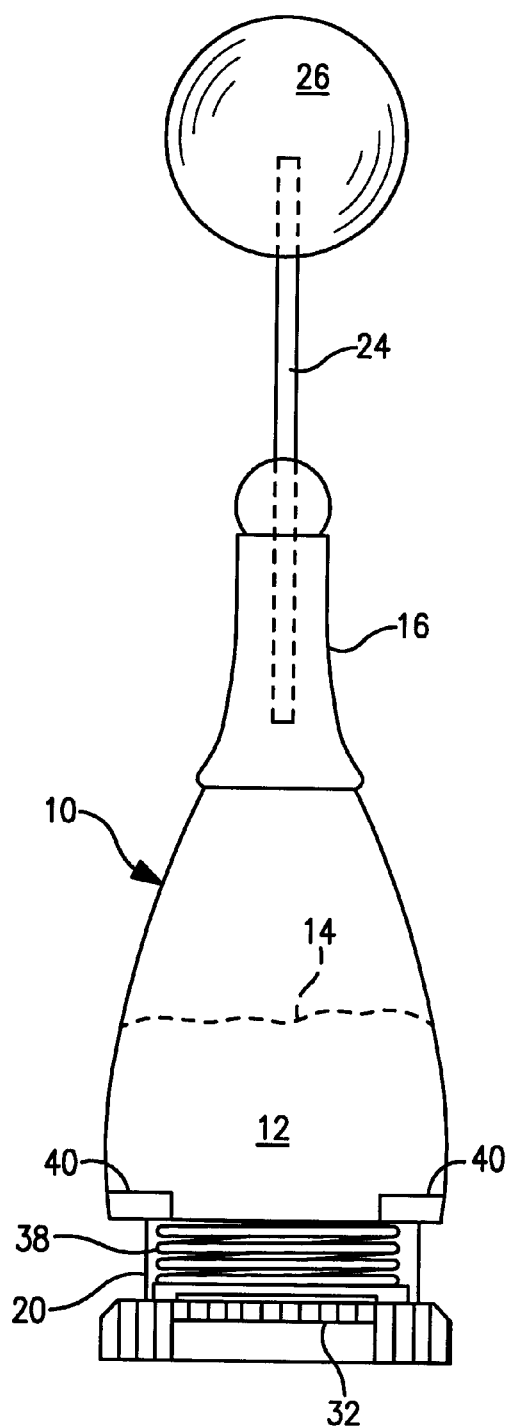
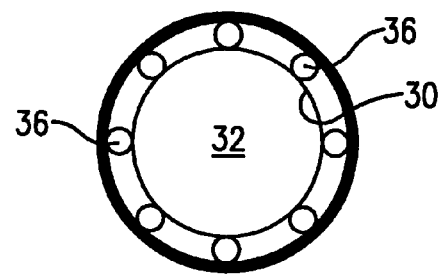
FIG. 5
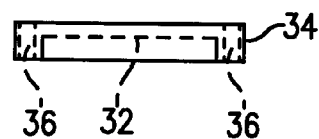
FIG. 6
FIG. 4

NOVELTY CANDY HOLDING DEVICE

This invention is directed to a candy holding device and more particularly to a candy holding device which has an added feature which is amusing to a person such as a child.

BACKGROUND OF THE INVENTION

Heretofore applicants have patented different types of candy holders, particularly a candy pop holder in combination with some type of amusement device.

OBJECTS OF THE INVENTION

It is therefore an object of the present invention to provide a candy pop holder in combination with an amusement device.

Another object is to provide a candy pop holder in combination with an amusement device which makes a blurp sound.

Still another object is to provide a candy holder in combination with an amusement device in which the amusement device provides an enjoyment for a person before and after consumption of the candy.

Yet another object is to provide a candy holder in combination with an amusement device which can provide an enjoyment during and after consumption of the candy in which the candy is a candy pop on a stick which can be replaced by a new candy pop once the candy pop has been consumed.

While still another object is to provide a candy holder in combination with an amusement device in which a candy pop can be molded onto the upper end of the device for consumption during play with the amusement device.

Still another object is to provide a candy holder in combination with an amusement device in which a candy pop can be molded onto the upper end for consumption and for play with the amusement device in the candy holder and is provided with means for a candy pop on a stick after consumption of the molded candy pop.

Other objects and advantages of the invention will become obvious to those skilled in the art upon a review of the drawings, specification and claims.

BRIEF DESCRIPTION OF THE DRAWINGS

FIG. 4 illustrates a diaphragm and spring combination held in place by the base cap;

FIG. 5 is a bottom view of the diaphragm illustrating the air passages along an inner surface, and FIG. 6 illustrates the diaphragm holder from a side view.

DETAILED DESCRIPTION

Figure 1:
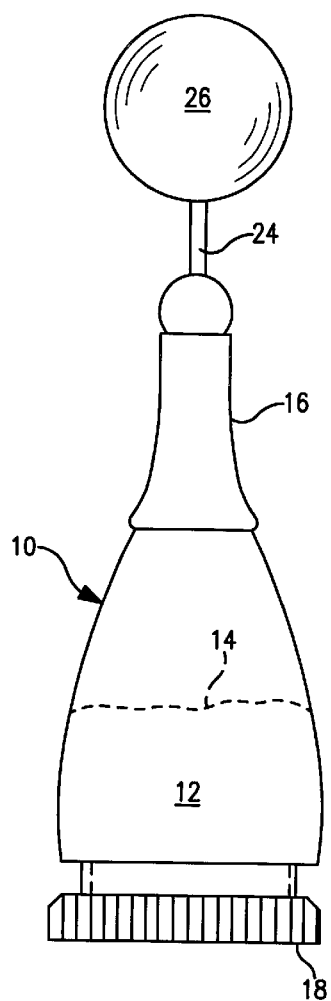
FIG. 1 is a side view of a complete candy holder and amusement device.
Figure 2:
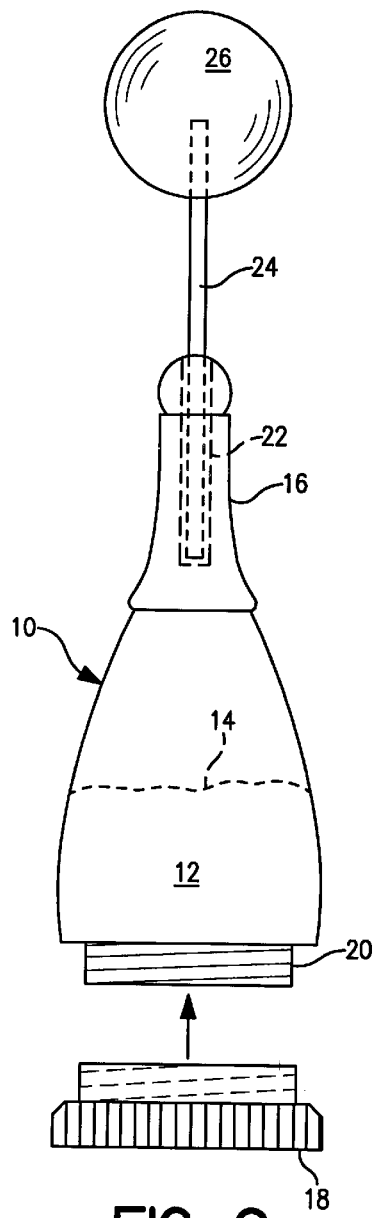
FIG. 2 is a side view of the device with the base cap shown separate from the main housing.

Now referring to the drawings wherein like reference characters represent like parts through the different views, there is shown in FIG. 1 a side view of a candy holder in combination with an amusement device including a soft pliable putty-like substance. The device includes a main housing 10 which contains the soft pliable putty-like substance 12 within the housing. The upper surface of the putty is shown by dotted lines 14. The housing is shown with a conical shape which extends from a larger diameter bottom to a smaller diameter upper end 16. The housing can be made of plastic or any other desirable material which can be clear or opaque. As shown, the housing has a bottom end cap 18 which can be screw threaded onto a bottom extension 20 which includes an opening into the housing. The bottom end cap could be a slip-on type which has a tight fit on surrounding the bottom extension 20. The upper end of the housing has a small diameter which includes an aperture 22 which has a diameter to receive a candy pop stick 24 to support a candy pop 26. It would be obvious that the aperture could be sufficiently large to receive an expandable candy pop stick holder for securing different sized sticks. As shown, the candy stick supports the candy pop 26.

Figure 3:
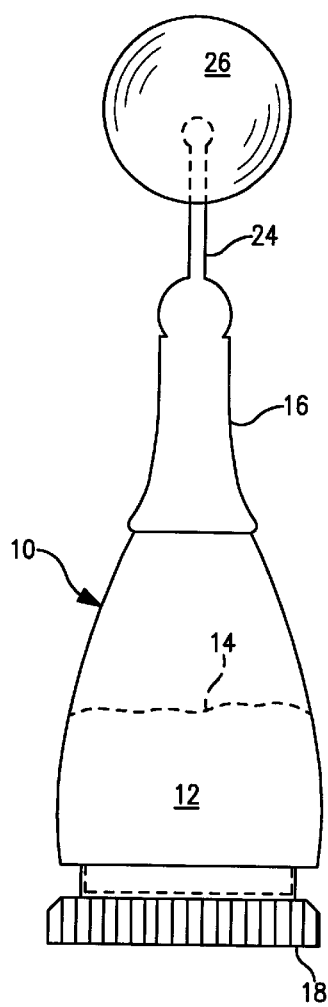
FIG. 3 is a modification showing a candy pop molded to an upper nipple.

It would be obvious to one skilled in the art that the upper end of the housing could have a nipple 28 as shown in FIG. 3 onto which a candy pop could be molded. The nipple could be a cylinder with an inner diameter large enough to receive a candy pop stick; then after the candy pop on the nipple has been consumed, a candy pop on a stick could be added by inserting the stick into the nipple. If the nipple has a closed end, the closed end could be broken off to expose the inner surface for receiving an end of the candy pop stick.

The bottom extension can be made with an enclosed bottom such as by a thin film. If so, the film would have to be removed to gain access to the pliable putty material. Then, in order to make blurp sounds, one must insert their finger or fingers into the end of the housing and into the putty which makes holes in the putty and by movement of the putty sounds will be made as air slips between and around the putty material. Once the person decides that enough sounds have been made, the end cap is secured back in place to prevent the putty material from drying out.

As shown in FIGS. 4–6, the end cap can be made with a central opening 30 through which one can reach the putty substance. In addition to the central opening, a diaphragm 32 made of a pliable and/or a stretchable material is secured between the end cap and the putty material. For illustrative purposes, the diaphragm 32 is secured to a cylindrical frame 34 which is provided with apertures 36 around the inner periphery of the diaphragm holder in order to permit passage of air into and from the area containing the putty material. As shown in FIG. 4, the diaphragm frame 34 is held in place by a spring 38 which seats on the diaphragm frame at one end and on a shoulder 40 of the housing at the opposite end of the spring. For amusement of the device shown in FIG. 4, one inserts their finger or fingers through the central opening at the end cap to contact the diaphragm. By forcing the fingers against a portion of the diaphragm, the portion will be forced toward and into the putty material to make a hole or holes in the putty material. As the hole or holes are made, air within the putty makes a noise as the putty and air are moved. When the finger or fingers are withdrawn, the diaphragm and putty material will return to their normal non-use position.

In order to prevent the putty material from being pushed up to the upper end of the housing, a partition could be secured in the housing so that the putty material could not be pushed beyond the partition.

Instead of using a spring to hold the diaphragm and frame in place, the diaphragm frame could be secured between the end cap and the bottom of the housing. In such an arrangement, the aperture along the inner periphery of the frame should not be covered between the end cap and the end of the housing but rather on the inner area so that the air can pass freely through the aperture.

The foregoing relates to preferred exemplary embodiments of the invention, it being understood that other variants and embodiments thereof are possible within the spirit and scope of the invention, the latter being defined by the appended claims.

We claim:

1. A novelty candy holding device comprising a main housing having an upper end, an open lower end and a chamber within the main housing, a pliable putty material within said chamber, an end cap secured to said open lower end of said main housing and a candy pop secured to the upper end of said main housing, said end cap having a central opening and a stretchable diaphragm secured across the central opening such that one can insert ones finger or fingers through the central opening and contact and force a portion of the diaphragm, with the finger or fingers, toward and into the putty material to make a hole or holes in the putty material which causes air within the putty material to make noise as the putty material and air are moved and such that the diaphragm and putty material will return to their original position when the finger or fingers are withdrawn from the diaphragm and the central opening.

2. A novelty candy holding device as set forth in claim 1, in which said candy pop is molded onto a candy pop stick, and said upper end of said main housing includes an aperture into which said candy pop stick can be inserted for securing said candy pop to said upper end of said main housing.

3. A novelty candy holding device as set forth in claim 1, in which said candy pop is molded onto a nipple extending upwardly from said upper end of said main housing.

4. A novelty candy holding device as set forth in claim 3, in which said nipple serves as a candy stick holder subsequent to consumption of said molded candy pop.

5. A novelty candy holding as set forth in claim 1, which includes a spring secured between a frame to which said stretchable diaphragm is secured along a peripheral edge and a shoulder on said main housing below said pliable putty-like substance.

* * * * *